US008531677B2

(12) United States Patent
Dunn et al.

(10) Patent No.: US 8,531,677 B2
(45) Date of Patent: Sep. 10, 2013

(54) FREQUENCY-SHIFTING INTERFEROMETER WITH SELECTIVE DATA PROCESSING

(75) Inventors: Thomas James Dunn, Penfield, NY (US); Christopher Alan Lee, Pittsford, NY (US); Mark Joseph Tronolone, Webster, NY (US)

(73) Assignee: Corning Incorporated, Corning, NY (US)

( * ) Notice: Subject to any disclaimer, the term of this patent is extended or adjusted under 35 U.S.C. 154(b) by 148 days.

(21) Appl. No.: 13/110,377

(22) Filed: May 18, 2011

(65) Prior Publication Data

US 2011/0292405 A1 Dec. 1, 2011

Related U.S. Application Data

(60) Provisional application No. 61/348,971, filed on May 27, 2010.

(51) Int. Cl.
*G01B 9/02* (2006.01)
(52) U.S. Cl.
USPC ........................................... 356/511

(58) Field of Classification Search
USPC .................. 356/511, 516, 506, 512–515, 519
See application file for complete search history.

(56) References Cited

U.S. PATENT DOCUMENTS

| | | | |
|---|---|---|---|
| 6,741,361 B2 | 5/2004 | Marron | |
| 7,209,499 B2 | 4/2007 | Farmiga et al. | |
| 7,259,860 B2 | 8/2007 | Marron et al. | |
| 7,268,889 B2 * | 9/2007 | Kulawiec et al. | 356/511 |
| 2009/0185585 A1 | 7/2009 | Farmiga et al. | |
| 2010/0128745 A1 | 5/2010 | Dunn et al. | |
| 2010/0128746 A1 | 5/2010 | Dunn et al. | |

* cited by examiner

*Primary Examiner* — Gregory J Toatley
*Assistant Examiner* — Rufus Phillips
(74) *Attorney, Agent, or Firm* — Timothy M Schaeberle

(57) ABSTRACT

A frequency-shifting interferometer is arranged for measuring an optical profile of a test object with a continuously tunable light source. A succession of the interference images of the test object are captured together with a measure of the beam frequencies at which interference images are formed. A limited number of the captured interference images of the test object are selected so that the monitored beam frequencies approximately match a predetermined beam frequency spacing pattern. Further processing proceeds based on the selected interference images.

19 Claims, 5 Drawing Sheets

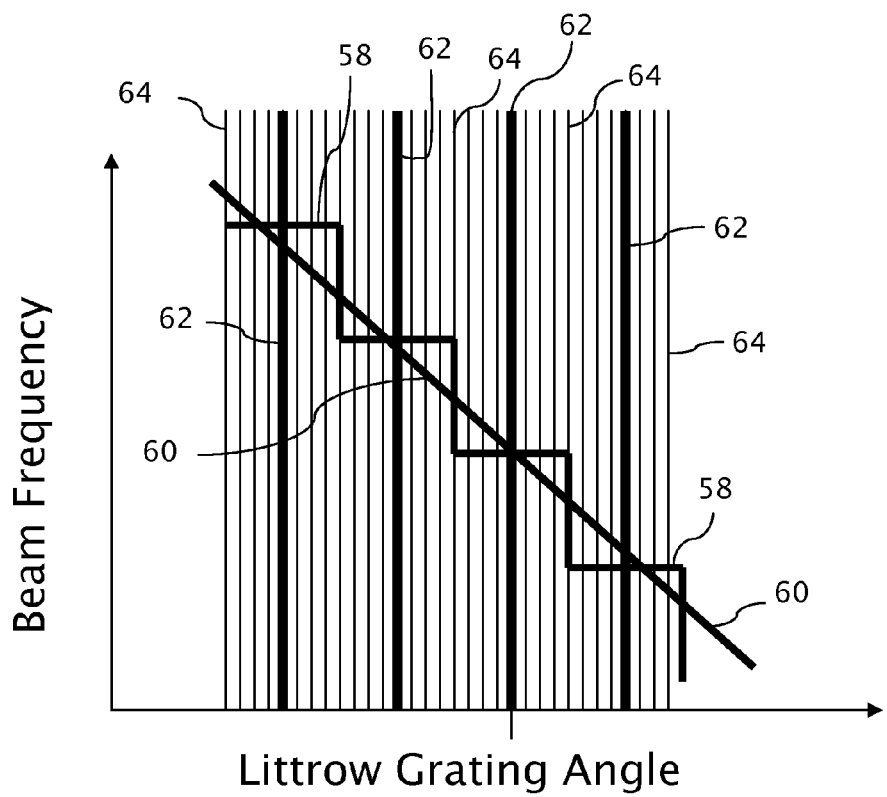
FIG. 2
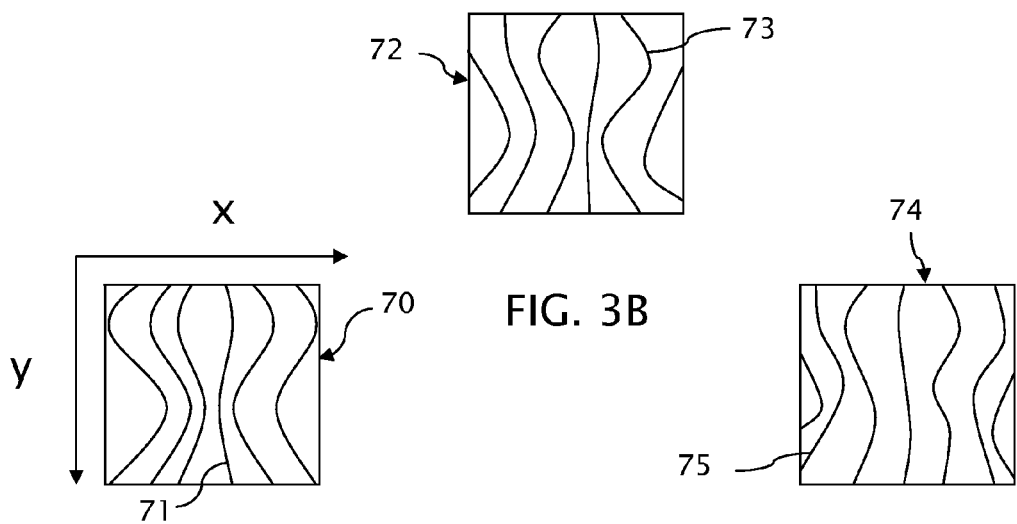
FIG. 3B
FIG. 3A
FIG. 3C

FREQUENCY-SHIFTING INTERFEROMETER WITH SELECTIVE DATA PROCESSING

CROSS-REFERENCE TO RELATED APPLICATIONS

This application claims the benefit of priority under 35 U.S.C. §119 of U.S. Provisional Application Ser. No. 61/348971 filed on May 27, 2010 the content of which is relied upon and incorporated herein by reference in its entirety.

TECHNICAL FIELD

The invention relates to frequency-shifting interferometry in which interference images are captured at different measuring beam frequencies and to processing methods exploiting relationships between the interference images for measuring optical profiles of test objects.

BACKGROUND

Most imaging interferometers (a) divide measuring beams into object beams that encounter test objects and reference beams, (b) recombine the object and reference beams, and (c) image the test objects with the recombined object and reference beams to form interference images of the test objects. Frequency-shifting interferometers exploit a recognition that interference phases of individual points within the interference images vary with the changes in measuring beam frequency at rates proportional to local optical path length differences between the object and reference beams. Intensity variations of corresponding image points within a plurality of interference images captured at different beam frequencies are evaluated to determine the rates (i.e., frequencies) at which the phases of the image points cycle through conditions of constructive and destructive with changes in beam frequency. The proportional optical path length differences associated with the determined frequencies of phase change for a plurality of image points can be assembled into optical profiles describing physical characteristics of individual test objects, such as surface topologies or optical thickness variations.

Unlike most other interferometers, which compare interference phases between different points within the same interference images for calculating relatively smooth optical profiles of the test objects, frequency-shifting interferometers compare the interference phases between the same points within different interference images formed at different measuring beam frequencies for calculating optical profiles over a greater range of greater point-to-point variation. To achieve desired accuracy over a significant range of point-to-point variation, however, frequency-shifting interferometers capture relatively large numbers of interference images at different beam frequencies. Examples are known in which 16 interference images have been captured for measuring smooth optical surfaces with continuous profiles while 128 interference images have been captured for measuring machined parts with more irregular profiles.

Algorithms for converting intensity data of individual points within a plurality of the interference images into rates of phase change can be simplified by evaluating interference patterns generated at equally spaced beam frequencies. Two different approaches have been used for producing successions of equally spaced beam frequencies. One approach linearly varies the spectral output of light sources over a continuum and captures interference images at equally spaced intervals of time. Another approach tunes the spectral output of light sources to discrete frequencies that are equally spaced. The former approach lacks accuracy because most light sources are not linearly variable over the required bandwidth because of various systematic, environmental, or other influences. Higher accuracy is achieved by monitoring the actual beam frequencies and employing a more complicated algorithm. The second approach is more time consuming and subject to noise from vibrations and temperature shifts. Extra time is required because the light sources must be adjusted to and stabilized at each discrete beam frequency. The tuning steps generate vibrations and measuring conditions, such as temperature, tend to drift over the extended period of measurement.

SUMMARY

The invention, among its preferred embodiments, varies the spectral output of a light source while capturing a succession of interference images at a high rate, e.g., at a rate higher that what would be required for capturing interference images in a desired pattern of beam frequency spacing. The beam frequencies at which the interference images are captured are monitored. Among a relatively large number of captured interference images, a subset of the captured interference images is identified at which the spacing pattern of the beam frequencies forming the identified interference images corresponds to a desired pattern, such as equal spacing. The subset of captured interference images is processed in accordance with an algorithm optimized to the desired spacing pattern, while the remaining captured interference images are excluded from the immediate processing.

Nonstop tuning of the light source over a range from one end of a desired bandwidth to the other end of the bandwidth reduces both vibrations and data acquisition time with respect to discrete tuning procedures that require stabilization at each of a plurality of target beam frequencies. While tuning over the range, a frame grabber associated with a camera captures interference images at a rate that preferably captures a multiple of the number of interference images intended for processing. Simultaneously, a frequency analyzer monitors the beam frequencies at which the interference images are captured. The frequency analyzer can include an interferometric beam monitoring cavity, such as an etalon, for forming interference patterns that are interpretable for measuring beam frequency, and the camera can include a data acquisition area arranged for acquiring both the interference images of the test object and the interference patterns representative of the beam frequency at which the interference images are formed. As such, the frame grabber captures not only interference images of the test piece but also captures interference patterns representative of the beam frequency at which the interference images are formed.

Intermediate to processing the captured interference images for measuring the test object, the beam frequencies at which the interference images captured are evaluated for identifying a set of captured interference images whose associated beam frequencies correspond to a desired beam frequency spacing pattern. Generally, for purposes of simplifying the later processing, a pattern of equal spacing is desired. Some variation can be accommodated in the step size of the spacing, i.e., the target frequency difference between the equally spaced frequencies, to match the available beam frequencies to the desired pattern of equal spacing. Known algorithms for processing captured interference images, such as discrete Fourier transforms which assume equal spacing, can accommodate different step sizes of the beam spacing with predictable results so long as the spacing itself remains equal. Interference patterns captured at finely spaced frequency intervals are preferred for expanding the range of unambiguous measurement, while an expanded frequency range (i.e., the number of such frequency intervals) is preferred for providing the desired measurement precision.

The frequency tunable light source is preferably an external cavity laser having a lasing cavity that exhibits a set of lasing modes and a fixed length feedback cavity that exhibits a set of feedback modes. The captured interference images exhibiting the highest contrast occur at common modes between the lasing cavity and the feedback cavity. The fixed optical path length of the feedback cavity is preferably set at an integer multiple of the optical path length of the lasing cavity under normal operating conditions. Accordingly, the modes of the lasing and feedback cavities generally match at a given multiple of the feedback mode spacing.

During a first non-stop, i.e., continuous, tuning sweep of the external laser, interference images captured at a first set of feedback modes matching the instant lasing cavity modes are preferably selected for processing. Following the first tuning sweep a lasing cavity mode adjuster (e.g., current controller) shifts the set of lasing modes to match a different set of feedback cavity modes spaced through the same feedback mode multiple. During a second non-stop tuning sweep of the external laser, interference images captured at a second set of feedback modes corresponding to the shifted lasing modes are preferably selected for processing. The lasing cavity modes can continue to be shifted to match a different set of the feedback cavity modes in support of subsequent non-stop tuning sweeps until captured interference images corresponding to all of the feedback modes within the tuning range are selected for processing. A beam monitoring cavity can be set at a fixed optical path length corresponding to the spacing between feedback modes to aid in the identification of the captured interference images at the equally spaced feedback modes.

BRIEF DESCRIPTION OF THE DRAWING FIGURES

FIG. 2 is a plot of beam frequency with respect to Littrow Grating angle contrasting data acquisition techniques.

FIG. 3A-3C depict a progression of interference images of an object surface intended for measurement.

DETAILED DESCRIPTION

Figure 1:
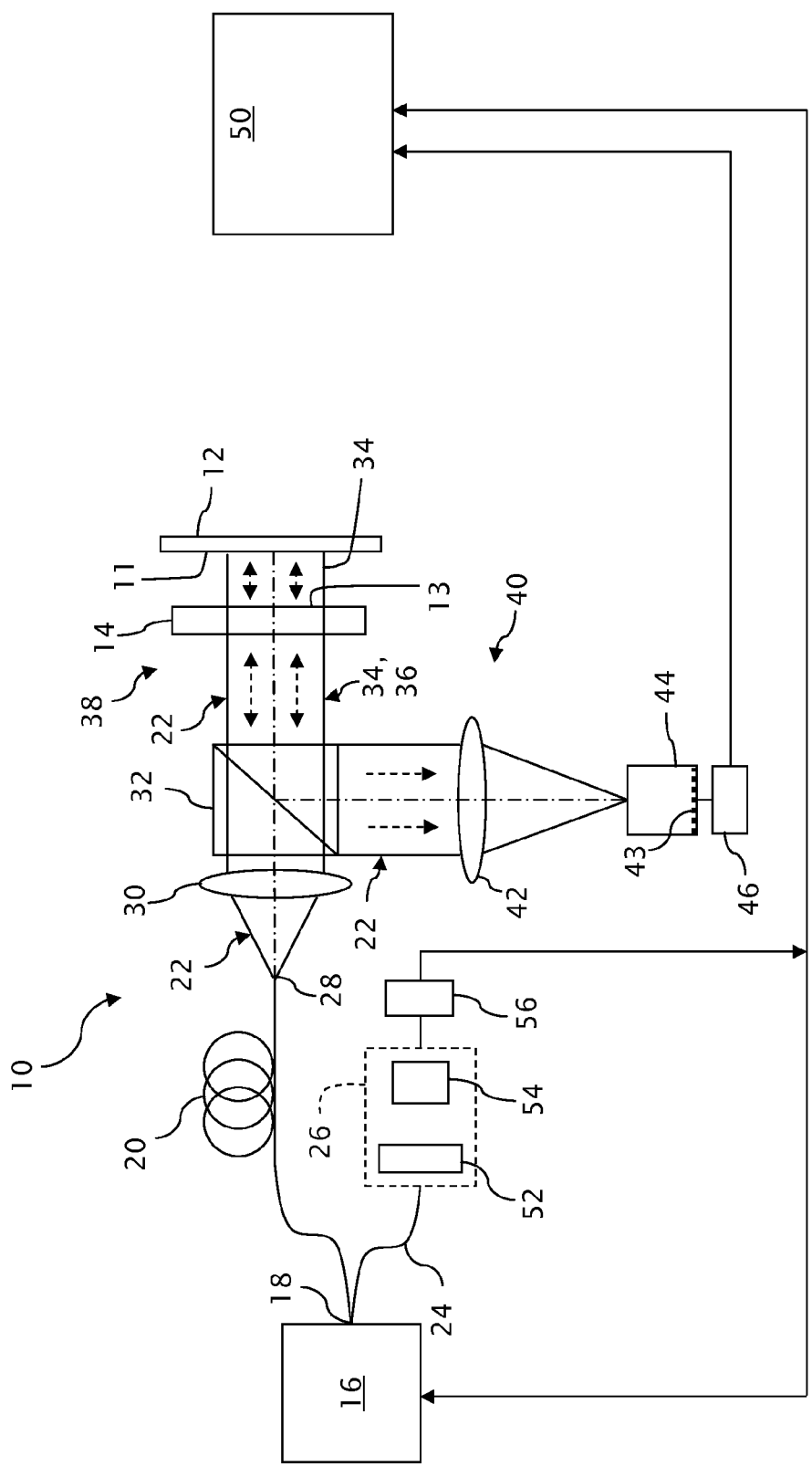
FIG. 1 is a diagram of a frequency-shifting interferometer arranged in accordance with an embodiment of the invention.

An image-based frequency-shifting interferometer 10 arranged in accordance with the invention is depicted in FIG. 1 in the configuration of a Fizeau interferometer for measuring the surface 11 (e.g., surface topology) of a test object 12 in comparison to a reference surface (i.e., Fizeau surface) 13 of an optical flat 14. The distance between the surface 11 of the test object 12 and the reference surface 13 of the optical flat, which might range from 130 microns (µm) to 300 millimeters (mm), provides access for measuring a variety of test objects over a range of measurement. Other interferometer configurations, including Michelson and Mach-Zehnder interferometers, can also be used for practicing of the invention. All such interferometer configurations, however, preferably have the capability of producing and processing multiple interference images of test objects at different measuring beam frequencies.

For example, the illustrated interferometer 10 includes a frequency tunable light source 16, which, through the intermediacy of a beamsplitter 18 and a fiber optic 20, outputs a measuring beam 22 having a beam frequency that is adjustable through a range of beam frequencies from one end of a bandwidth to the other end of the bandwidth. Another fiber optic 24 optically coupled to the same beamsplitter 18 transmits a smaller portion of the output of the frequency tunable laser 16 to a frequency analyzer 26 for monitoring the frequency of the measuring beam 22.

The frequency tunable light source 16 is preferably a continuously tunable laser source that is mode hop free. For example, external cavity diode lasers arranged in Littrow or Littman configurations can be continuously tuned over bandwidths necessary for achieving desired accuracies. The beamsplitter 18 can operate within free space at the output of the tunable laser 16 or within a fiber junction. An output 28 of the fiber 20 relays a point source to a beam shaping portion of the interferometer 10, which includes a collimator 30 for limiting the size and angular spread of the measuring beam 22.

A beamsplitter 32, shown as a cube beamsplitter, transmits at least a portion of the collimated measuring beam 22 into a measurement arm 38 that includes the Fizeau surface 13, which also functions as a beamsplitter that divides the measuring beam 22 into an object beam 34 and a reference beam 36. The object beam 34 propagates through the reference flat 14 and Fizeau surface 13 and reflects from the surface 11 of the test object 12 on a return path through the Fizeau surface 13 and reference flat 14. The reference beam 36 reflects from the Fizeau surface 13. The reflected object beam 34 recombines with the reflected reference beam 36 at the Fizeau surface 13 on a return path to the beamsplitter 32. The returning measuring beam 22 includes information gained from the encounter of the object beam 34 with the object surface 11 as a change in wavefront shape with respect to the wavefront shape of the reference beam 36.

At least a portion of the returning measuring beam 22 reflects from the beamsplitter 32 into an imaging arm 40 of the interferometer 10. Imaging optics 42 within the imaging arm 40 form an image of the object surface 11 onto a data acquisition surface 43 (e.g., detector array) of a camera 44. The image formed is an interference image created by interactions between the object and reference beams 34 and 36. Each point within the image has an intensity that is modulated by the interference between conditions of constructive interference (the brightest intensity) and destructive interference (the dimmest intensity). The angular phase of an image point within a $2\pi$ cycle of constructive and destructive interference is the modulo $2\pi$ difference in units of $2\pi$ wavelengths between the optical path lengths traveled by components of the object and reference beams that form the image point.

Although the beamsplitter 32 is shown as a cube for directing and redirecting collimated light, an alternative beamsplitter, such as in a plate form, could be located within an expanding portion of the measuring beam for operating similarly at a reduced size. For preserving light, the beamsplitter could be arranged as a polarizing beamsplitter that is used in conjunction with a quarter-wave retarder (not shown) along the measuring arm for reflecting more of the returning light along the imaging arm. Preferably, the imaging optics 42 are arranged as a telecentric imaging system for minimizing perspective errors of imaged surface features.

A frame grabber 46 associated with the camera 44 captures the interference images for recording and processing in a data processing computer 50. Preferably, the frame grabber 46 is driven at a high cycle rate for capturing a closely-spaced succession of interference images as the tunable light source 16 is swept from one end of its bandwidth to the other end of its bandwidth. The frame grabber 46 can be implemented in hardware connected to the camera 44 or in software that can be run within the computer 50.

In addition to recoding the interference images, the frequencies at which the interference images are formed are also recorded within the computer 50 (e.g., random access memory). The beam frequencies are acquired by the frequency analyzer 26, which also preferably has the form of an interferometer. As such, the frequency analyzer 26 includes an interferometric beam monitoring cavity 52, preferably as an etalon, which forms fringes that vary in both position and density with changes in beam frequency. A charge-coupled diode (CCD) array 54 acquires the interference patterns of the beam monitoring cavity 52. A frame grabber 56, which can also be implemented in hardware or software, is driven in synchronism with the frame grabber 46 for capturing the interference patterns of the beam monitoring cavity 52 that are formed simultaneously with the interference images of the Fizeau interferometer 10. Additional details of a frequency analyzer for monitoring beam frequencies are disclosed in co-assigned US Pat. No. 7,259,860 entitled OPTICAL FEEDBACK FROM MODE SELECTIVE TUNER and hereby incorporated by reference.

Within the computer 50 or other processing unit, the interference patterns recorded from the beam monitoring cavity 52 are interpreted for monitoring the frequency of the measuring beam 22 at which the recorded interference images are formed. The monitored beam frequencies can be used for selecting among the recorded interference images whose frequencies correspond to a predetermined pattern for simplifying processing information about the object surface 11. In addition, the monitored beam frequencies can be used as feedback for the tunable light source 16 for calibrating or otherwise regulating the performance of the light source 16. Although the frequency analyzer 26 is preferably positioned close to the tunable laser 16, which is typically a more controlled environment, the measuring beam 22 can be sampled elsewhere along its length, except where such sampling would have a deleterious effect on the intended measurements made by the interferometer 10.

FIG. 2 contains a plot of beam frequency with respect to a Littrow grating angle. Here, the tunable light source is assumed to be an external cavity diode laser having a pivotable diffraction grating in a Littrow configuration. The grating angle of the pivotable diffraction grating controls the feedback frequency available for resonance within the laser. Preferably, the grating angle is changed with time so that the abscissa can also be interpreted as an equivalent to passing time, i.e., beam frequency plotted as a function of time. In practice, a small adjustment to the angular speed of the diffraction grating (such as may be defined by a quadratic term) may be required to more closely approach a linear change in beam frequency over time. The tuning itself is preferably continuous, although the frequency response of the laser can still include stepwise changes resulting from lasing preferences or other conditions associated with the laser.

The change in grating angle preferably proceeds without interruption from one and of the laser bandwidth to the other end of the laser bandwidth. Other than to start and stop the angular motion of the diffraction grating at the two ends of the bandwidth, neither the diffraction grating nor any related drive or mounting components are subject to shocks and associated vibrations that would otherwise accompany the tuning of the laser to discrete frequencies within the bandwidth. Any variations in the angular speed of the grating imparted to produce a more linear frequency response over time are preferably gradual to avoid similar shocks and vibrations.

For purposes of comparison, the plot of FIG. 2 includes a stepped line 58 depicting the performance of a step tunable laser in which beam frequency changes abruptly at particular grating angle positions and a straight line 60 depicting the performance of a continuously tunable laser in which beam frequency changes more gradually (e.g., proportionally) with the change in grating angle position such as intended for the light source 16. Heavy vertical lines 62 represent grating angle positions at which interference image frames are captured for step tunable lasers. The thinner but more closely spaced vertical lines 64 represent the grating angle positions at which interference image frames are preferably captured by the frame grabber 46 for purposes of the invention.

FIGS. 3A-3C depict a succession of three different interference images 70, 72, and 74 of the object surface 11 captured at closely spaced intervals of time or grating angle positions. Preferably, the grating angle is changed progressively over time so that the frame grabber 46 captures the interference images 70, 72, and 74 at closely spaced intervals of time having regard for the desired integration interval of the camera 44. That is, the temporal spacing between frames is preferably not less than the integration interval of the camera required for acquiring the interference images to a desired resolution and signal-to-noise ratio. Although the interference images 70, 72, and 74 are shown with discernable fringe patterns 71, 73, and 75 that vary with the progressive changes in beam frequency, viable fringe patterns can also appear as speckle devoid of discernable fringes, particularly for machined surfaces that are not polished to optical accuracies. Preferred processing considers intensity (phase) changes of individual pixels (representing individual points on the object surface 11) within a plurality of the interference images rather than as a comparison between adjacent pixels of individual interference patterns.

Figure 4:
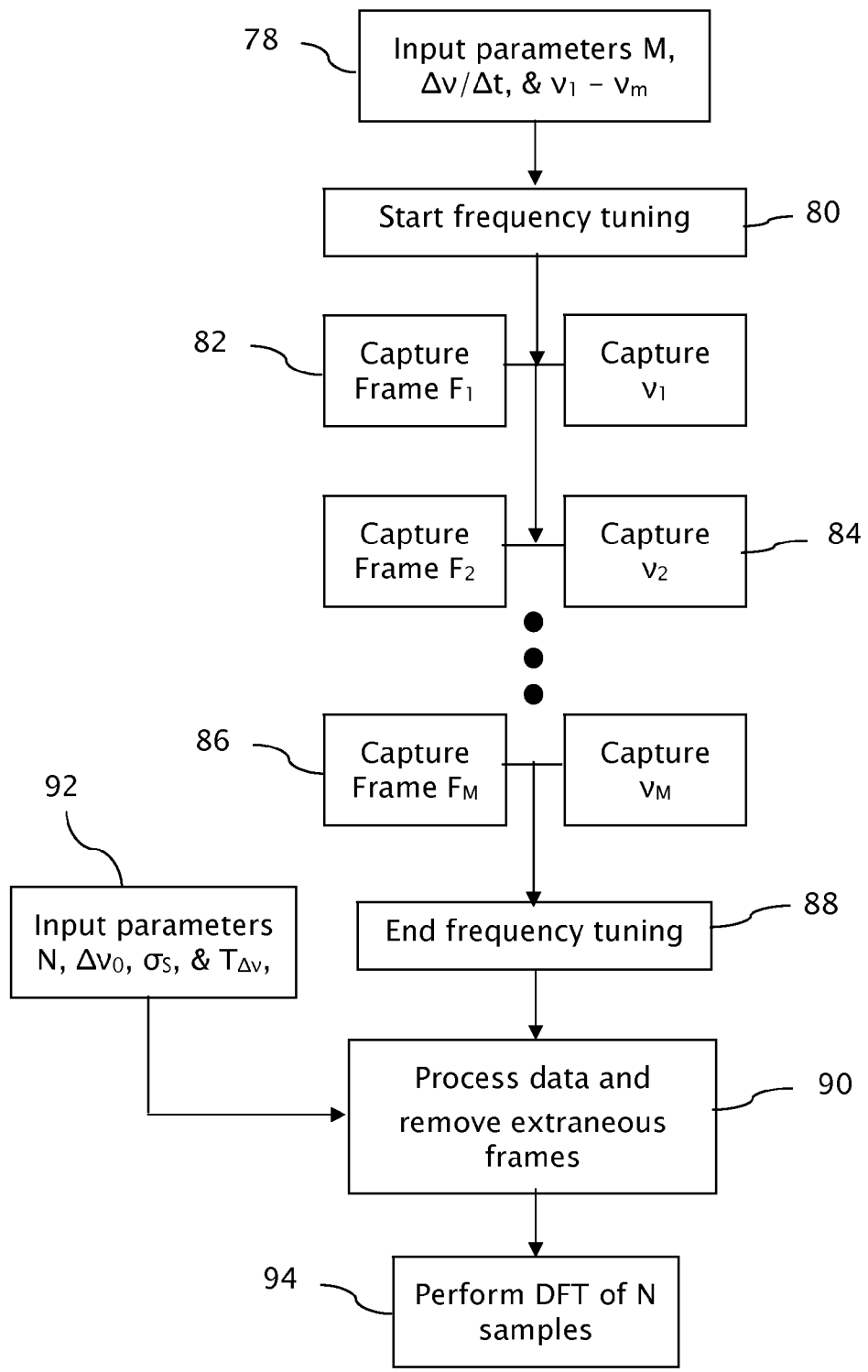
FIG. 4 is a flow diagram containing steps for capturing and processing data in accordance with one or more embodiments of the invention.

A high speed data acquisition and processing routine is depicted FIG. 4. Input at step 78 sets parameters for data acquisition, including a number M of frames F to be captured, a tuning rate $\Delta v/\Delta t$ of a change in beam frequency over a change in time, and a frequency bandwidth $v_1$ through $v_m$ over which frames $F_1$ through $F_M$ are to be captured. Based on these input parameters M, $\Delta v/\Delta t$, and $v_1 - v_m$, the computer 50 at step 80 exerts control over the tunable light source 16 initiating nonstop tuning from one end of the bandwidth $v_1$ to the other $v_m$. Within steps 82, 84, and 86, a succession of interference images are captured as frames $F_1$, $F_2$, through $F_M$ at progressively varying beam frequencies, $v_1$, $v_2$, through $v_m$. At step 88, tuning is discontinued after a total of M frames F have been captured throughout the desired frequency bandwidth from $v_1$ to $v_m$, and control is passed to an algorithm at step 90 for selecting among the succession of interference images captured within frames $F_1$ to $F_M$ for further processing.

For example, the number M of frames F captured can total 256 frames at a capture rate of 200 frames per second over a bandwidth $v_1$ to $v_m$ of 359 terahertz (THz) to 363 terahertz (THz) with each frame F acquired over an integration interval of approximately 4 milliseconds (ms). Preferably, the number M of frames F that are captured is at least 2 to 3 times the number N of frames actually used. The integration interval can vary with the response time of the camera 44 up to the inverse of the frame grabbing rate. The number of frames actually used can vary with the requirements for processing and, by example, can vary between 32 and 256 frames F. Other data capture rates and frequency ranges can also be used in accordance with the desired precision and range of measurement.

Additional input to the algorithm is provided at step 92 for setting parameters of the selection algorithm. The parameters can include, for example, the number N of the frames F intended for processing, a nominal target frequency spacing $\Delta v_0$ between adjacent selected frames F together with a permissible variance range $\sigma_s$ about the nominal target frequency spacing $\Delta v_0$ at which a target frequency spacing $\Delta v$ is found such that any differences between target frequency spacing $\Delta v$ and each of the actual frequency spacings $\Delta v_1$ through $\Delta v_{N-1}$ among the N selected frames F remain within a spacing tolerance $T_{\Delta v}$. For example, the input parameters can include a number N of 128 frames F, a nominal target frequency spacing $\Delta v_0$ of 35 gigahertz (GHz), a variance range $\sigma_s$ of the target spacing and a spacing tolerance $T_{\Delta v}$. The spacing tolerance $T_{\Delta v}$ depends upon the optical path length difference between the object and reference arms of the interferometer, which for the illustrated Fizeau interferometer 10, corresponds to the distance between the test object surface 11 and the reference surface 13. The larger the difference between the optical path lengths traversed by the object and reference beams, the tighter the spacing tolerance $T_{\Delta v}$ becomes (i.e., in inverse relation). For example, at a distance between the test object surface 11 and the reference surface 13 of 20 millimeters, the spacing tolerance $T_{\Delta v}$ can be set in the instant example at approximately 100 megahertz (MHz). However, if the distance between the test object surface 11 and the reference surface 13 is increased to 200 millimeters, then the spacing tolerance $T_{\Delta v}$ should be tightened, for example, to approximately 10 megahertz (MHz). In addition, since the laser 16 is generally expected to be tuning during the collection of data, the integration interval of the camera and the tuning speed of the laser should also be chosen so that the laser frequency changes by less than the spacing tolerance $T_{\Delta v}$.

Based on the input parameters N, $\Delta v_0$, $\sigma_s$, and $T_{\Delta v}$, a limited number N of the frames F can be selected at the step 92 for further processing. Any of the frames F not selected for further processing can be discarded. Passed to step 94 for further processing is both interference data within the N number selected frames F and the frequency spacing $\Delta v$ between the selected frames F. Step 94 operates on the interference data within the selected interference frames F based on a processing algorithm, such as a discrete Fourier transform (DFT) algorithm, that assumes a particular frequency spacing pattern (e.g., the frequency spacing $\Delta v$ between the selected frames F).

The frames F selected for processing at step 92 can be optimized or otherwise matched to the parameters of the DFT algorithm of step 94. For example, only frames F whose monitored frequencies coincide with the target frequencies of the DFT algorithm within the intended bin range of the DFT algorithm are selected; although within bounds $\sigma_s$, the target frequencies of the DFT algorithm can be adjusted to the frequency spacing of the collected data. Individual frames F can also be evaluated for quality, including a minimum contrast, and frames F not meeting these quality standards can be discarded to avoid skewing measurements with data of lower confidence value.

Intensity data l(i, j, n) for each pixel (i, j) of the data acquisition surface 43 of a camera 44 is gathered over the plurality of selected interference images (n=1 to N) as an intensity data set. Within each selected intensity data set, an individual pixel (i, j) is associated with N intensity values corresponding to local values within the interference images produced at N different measuring beam frequencies $v(n)$. The data set for each pixel contains interference information relating to modulo $2\pi$ phase offsets between the object and reference beam components 34 and 36 from respective finite areas of the object and reference surfaces 11 and 13 that are imaged onto individual pixels within the data acquisition surface 43 of a camera 44.

Calculations, such as Fourier transforms, convert the intensity data sets into approximate topographical measures of local test surface height H(i, j) or as similar measures of optical thickness variations. Fourier transforms can be used to describe the intensity values of each set as a function of the regularly changing beam frequency $v(n)$ in the form of a peak amplitude sinusoid, itself having a modulation frequency FM that is directly related to the local height H(i, j) of a corresponding point on the object surface 11. Each different local height H(i, j) is associated with a unique modulation frequency FM corresponding to the number of cycles of constructive and destructive interference effected in an individual pixel over the range of sampled (i.e., selected) beam frequencies $v(n)$ and which is evident from the Fourier transform as the frequency FM of the peak amplitude sinusoid or as an alias thereof.

Examples of such processing can be found in U.S. Pat. No. 6,741,361 entitled MULTI-STAGE DATA PROCESSING FOR FREQUENCY-SCANNING INTERFEROMETER, which is hereby incorporated by reference. Although the intensity patterns from unevenly spaced measuring beam frequencies can be transformed into similar measures of local optical path lenth differences between the reference and object beams, the calculation of approximate local heights H(i,j) of the object surface 11 from each set of a single pixel's data can be simplified by selecting the different interference image frames F at equally spaced beam frequency intervals $\Delta v$ and finding the peak amplitude sinusoid using a Fast Fourier Transform (FFT).

Other algorithms can be arranged to operate at equal frequency intervals $\Delta v$ or in other spacing patterns such as quadratic or higher order polynomial spacing patterns. Processing can be performed in stages with a limited number of interference images at closely spaced beam frequencies being evaluated to perform measurements over a longer range of optical distances and with a limited number of other interference images at more widely spaced beam frequencies being evaluated to improve the accuracy of the measurement.

Figure 5:
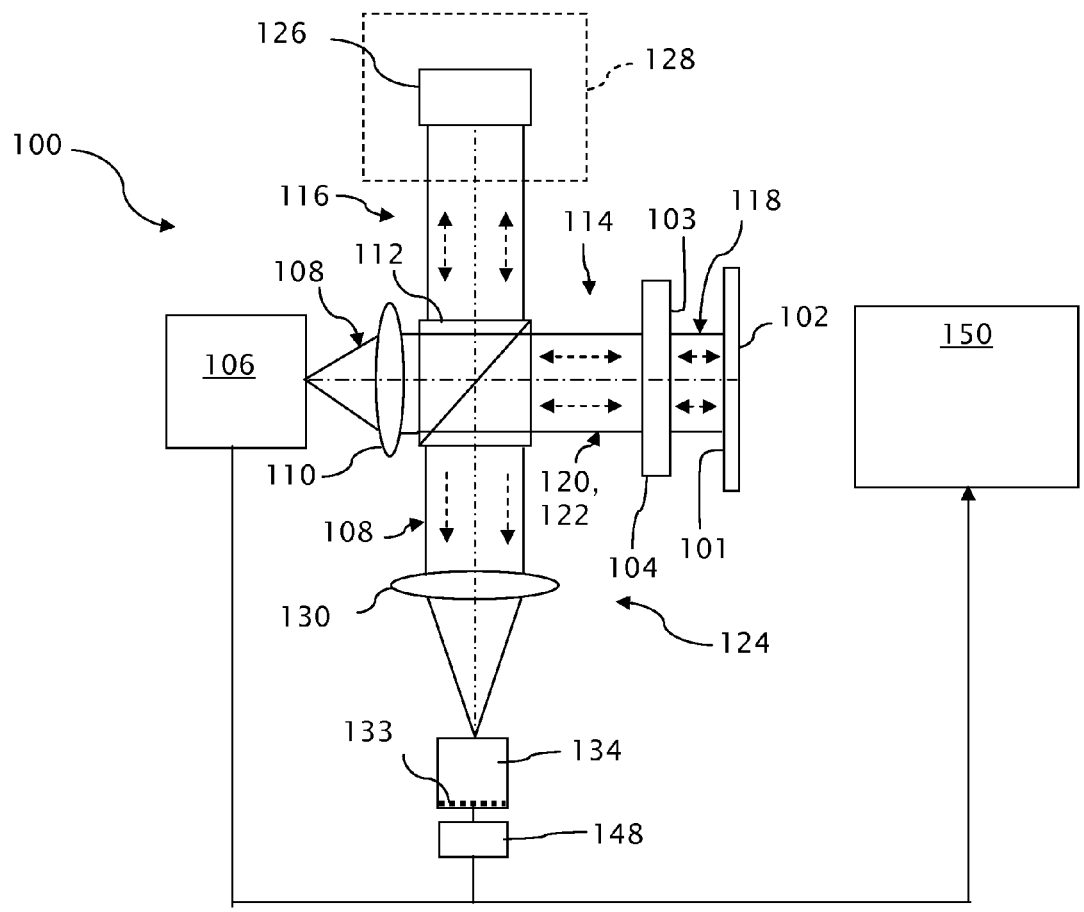
FIG. 5 is a diagram of an alternative frequency-shifting interferometer in which a single camera records interference data about both an object surface and a measuring beam frequency at which the data is captured.

An alternative frequency-shifting interferometer 100 is shown in FIG. 5 also in a Fizeau configuration for measuring the surface 101 (e.g., surface topology) of a test object 102 in comparison to a reference surface (i.e., Fizeau surface) 103 of an optical flat 104. Similar to the frequency-shifting interferometer 10, the frequency-shifting interferometer includes a continuously tunable light source 106, which is also preferably an external cavity laser in a Littrow or Littman configuration that can be continuously tuned over the desired bandwidth from $v_1$ through $v_m$. An expanded output of the tunable light source 106, which forms a measuring beam 108, is shaped by a collimator 110 for limiting the size and angular spread of the measuring beam 108.

A beamsplitter 112, which is preferably a cube beamsplitter, functions as a routing junction for splitting and recombining the measuring beam 108. A primary portion of the measuring beam 108 transmits through the beamsplitter 112 into a measuring arm 114, and a secondary portion of the measuring beam 108 reflects into a monitoring arm 116. The reflectivity of a beamsplitter 112 can be controlled to distribute different portions of the optical power of the measuring beam 108 between the measuring arm 114 and the monitoring arm 116. Generally less power is consumed by the monitoring arm 116.

The transmitted primary portion of the measuring beam 108 is further divided at the Fizeau reference surface 103 into an object beam 120 that transmits through the reference surface 103 and is reflected from the object surface 101 and a reference beam 122 that reflects from the reference surface 103. The reflected object beam 120 recombines with the reflected reference beam 122 at the reference surface 103 on a return route to the beamsplitter 112. As least a portion of the recombined object and reference beam portions 120 and 122 of the measuring beam 108 reflects from the beamsplitter 112 into an imaging arm 124.

The reflected secondary portion of the measuring beam 108 that enters the monitoring arm 116 propagates into engagement with an interferometric beam monitoring cavity 126 within a frequency analyzer 128. Preferably, the beam monitoring cavity 126 takes the form of an etalon for forming a pattern of interference whose fringes vary in both position and density with changes in beam frequency. Upon reflection from the beam monitoring cavity 126, the returning secondary portion of the measuring beam 108 transmits through the beamsplitter 112 into the imaging arm 124.

Figure 6:
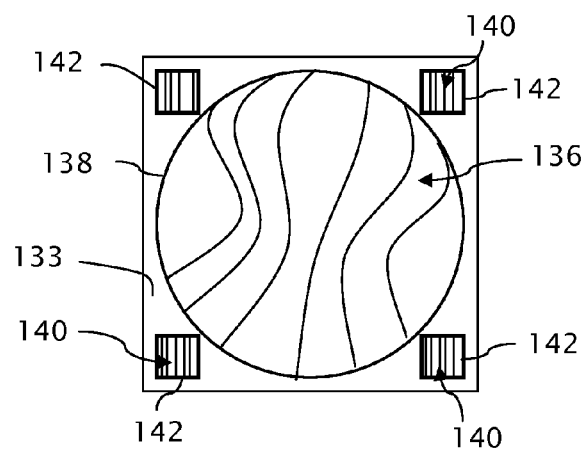
FIG. 6 depicts the interference images of the object surface and measuring beam within a common image acquisition surface of the camera.

Imaging optics 130 within the imaging arm 124 image both a Fizeau cavity (i.e., the object and reference surfaces 101 and 103) within the measuring arm 114 and the beam monitoring cavity 126 within the monitoring arm 116 onto a data acquisition surface 133 of a camera 134. With reference to FIG. 6, interference images 136 of the object and reference surfaces 101 and 103 of the Fizeau cavity from the measuring arm 114 appear within a first portion 138 of the data acquisition surface 133 of the camera 134, and interference images 140 of the beam monitoring cavity 126 from the monitoring arm 114 form within a second portion 142 of the data acquisition surface 133 of the camera 134. The interference images 140 from the monitoring arm 114 are preferably spatially isolated within the second portion 142 of the data acquisition surface 133 from the interference images 136 within the first portion 138 of the data acquisition surface 133 such as by spatial aperturing within one or both of the measuring arm 114 and the monitoring arm 116 or by locating the beam monitoring cavity 126 outside the image field of the Fizeau cavity between the object and reference surfaces 101 and 103.

A frame grabber 148, which can be operated in hardware or software, simultaneously captures the interference images 136 and 140, which appear together within the data acquisition surface 133 of the camera 134. By capturing the interference images 136 and 140 within the same camera frames F, the interference data about the object surface 101 is synchronized with the beam frequency data at which the interference data is captured.

Figure 7:
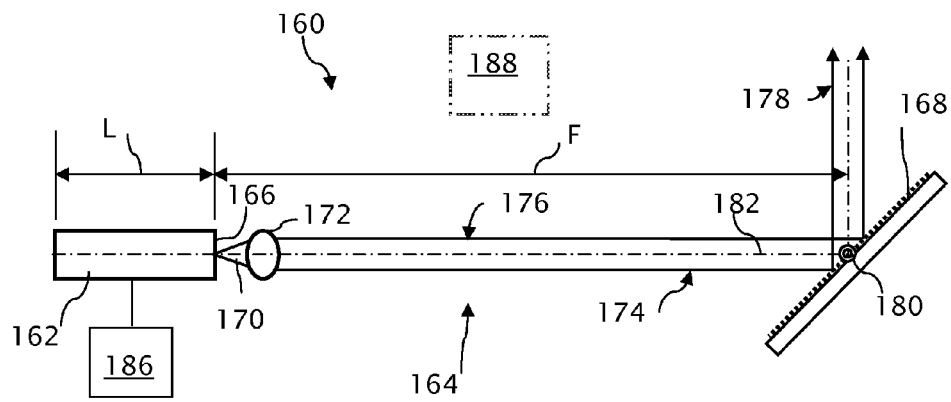
FIG. 7 is a diagram of a tunable external cavity laser together with a lasing mode adjuster for capturing interference data intended for processing through a succession of tuning sweeps.

FIG. 7 depicts a tunable external cavity laser 160 in a Littrow configuration that can be used as the frequency tunable light source 16 or 106 of the previous embodiments. Examples of external cavity lasers in a Littrow configuration, which are adaptable to the purposes of the invention, are disclosed in U.S. Pat. No 7,209,499 and US Patent Application Publication No. 2009/0185585 both of Farmiga et al. An example of an external cavity laser in a Littman configuration, which is similarly adaptable to the purposes of the invention, is disclosed in US Patent Application Publication No. 2010/0128746 of Dunn et al. All three of these disclosures are hereby incorporated by reference.

The external cavity laser 160 includes a lasing cavity 162, such as a laser diode, and a feedback cavity 164 that extends between a partially reflective output facet 166 of the lasing cavity 162 and a pivotable reflective diffraction grating 168. Coherent light 170 output from the lasing cavity 162 is captured and collimated by a lens 172 for propagation as a collimated beam 174 throughout a remaining length of the feedback cavity 164. At the diffraction grating 168, first order diffracted light is retroreflected as a collimated beam 176 back toward the lasing cavity 162, while first order diffracted light is reflected as an output beam 178. The retroreflected beam 176 is focused by the lens 172 onto the partially reflective output facet 166 and is split again with one portion transmitting through the output facet 166 and reentering the lasing cavity 162 to provide feedback within the lasing cavity and another portion reflecting from the output facet 166 to remain within the feedback cavity 164.

The lasing cavity 162 has a nominal optical path length L and the feedback cavity has a nominal optical path length F, which is set at an integer multiple M of nominal optical path length L of the lasing cavity 162. Although the two optical path lengths L and F are dimensioned in FIG. 7 as if physical lengths, the two optical path lengths L and F are also intended to account for the refractive indices of the optical mediums within the two cavities 162 and 164. The nominal optical path length L, for example, is a product of the physical length of the lasing cavity 162 multiplied by the refractive index of the lasing medium within the lasing cavity 162.

The reflective diffraction grating 168 is pivotable about an axis 180, which is located along a common optical axis 182 of the lasing and feedback cavities 162 and 164. Thus, pivoting the diffraction grating 168 about the axis 180 does not change the nominal optical path length F. However, changing the pivot angle progressively varies the frequency (wavelength) that is retroreflected back to the lasing cavity 162 over a continuum of frequencies. Frequencies whose wavelengths are evenly divisible into twice the feedback cavity length F can establish resonance within the feedback cavity 164. Similarly, frequencies whose wavelengths are evenly divisible into twice the lasing cavity length can establish resonance within the lasing cavity. The resonant frequencies meeting these conditions are referred to as modes. The optical power of the output beam 178 is greatest when a common resonance is established in both the lasing cavity 162 and the feedback cavity 164. The integer multiple M relationship between the nominal optical path lengths L and F of the two cavities 162 and 164 assures that each of the lasing cavity modes matches one of the feedback cavity modes.

Figure 8:
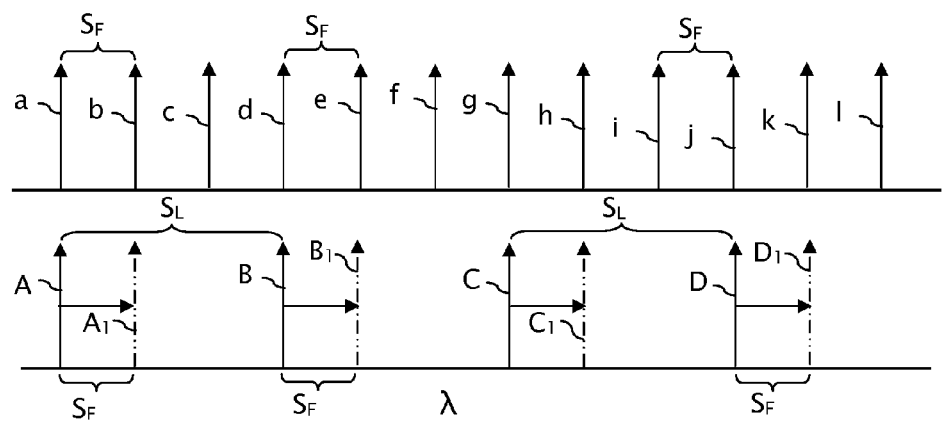
FIG. 8 is a compound number line of beam frequencies comparing lasing and feedback cavity modes.

As shown in FIG. 8, lasing cavity modes A, B, C, and D are matched with feedback cavity modes a, d, g, and j at a mode multiple M of three. Thus, during a single frequency sweep (i.e., a progressive pivoting of the diffraction grating 168), the output power of the beam 178 peaks at each of the evenly space lasing cavity modes A, B, C, and D. Preferably, these frequencies are recognized as the target frequencies for selecting corresponding frames F for further processing.

The spacing between the target frequencies can be further reduced to match the spacing between the feedback cavity modes a-l by using a mode adjuster 186, such as a current controller, to shift the nominal modes A-D of the lasing cavity 182 by the frequency spacing $S_F$ between the feedback cavity modes a-l and re-sweeping the external cavity laser 180 through a similar range of feedback frequencies. An example of a current-driven frequency stepped laser, which provides for incrementally shifting between mode frequencies, is disclosed in US Patent No. 2010/0128745 of Dunn et al., which is hereby incorporated by reference.

For example, the mode adjuster 186, as a current controller, can adjust the current to the lasing cavity 182, as a laser diode, to modify the index of refraction of the lasing media and thereby the optical path length L of the lasing cavity by small increments of approximately 1/M wavelengths. Because of the large number of wavelengths filling the lasing and feedback cavities 162 and 164, the spacing $S_L$ between the new lasing cavity modes $A_1$, $B_1$, $C_1$, and $D_1$ remains substantially the same, although shifted through the frequency spacing $S_F$ of the feedback cavity modes a-l. The mode shift is comparable to a collective phase shift of fringes rather than a change in fringe spacing. As so shifted, the new lasing cavity modes $A_1$, $B_1$, $C_1$, and $D_1$ correspond to a different set of feedback cavity modes b, e, h, and k.

After shifting the lasing cavity modes A, B, C, D through the feedback cavity mode spacing $S_F$ to modes $A_1$, $B_1$, $C_1$, and $D_1$, the reflective diffraction grating 168 can be re-pivoted about the axis 180. Preferably, these new frequencies at which the lasing cavity modes $A_1$, $B_1$, $C_1$, and $D_1$ are aligned with the feedback cavity modes b, e, h, and k are recognized as the target frequencies for selecting corresponding frames F for further processing. Successive lasing cavity mode shifts through the feedback mode spacing $S_F$, along with successive sweeps of the diffraction grating 186 through the desired frequency range can be performed until a total of M tuning sweeps have been performed so that all of the feedback cavity modes a-l have been realized as target frequencies. The fixed length feedback cavity 164 assures that the target frequencies, which correspond to the feedback cavity modes a-l, are equally spaced.

A mode monitoring cavity 188 can be set at an optical path length corresponding to the fixed optical path length of the feedback cavity 164 to aid in the identification of the target frequency modes of the feedback cavity. The mode monitoring cavity 88 can be integrated into the interferometer similar to either the frequency analyzer 26 of FIG. 1 or the beam monitoring cavity 126 of FIG. 5.

The frame grabber 46 or 148 as shown in FIGS. 1 and 5 captures data frames from successive images of the interference patterns over limited integration intervals. The tuning rate of the frequency tuning device, e.g., the pivotable reflective diffraction grating 168, is set in relation to the integration interval so that variation within the imaged interference patterns is minimal over the interval. Image contrast can be monitored for establishing this timing relationship. For example, a maximum tuning rate can be established at which image contrast meets or exceeds a threshold value for processing the interference data.

Within conventional laser diodes, the frequency spacing between the lasing cavity modes progressively varies as a function of the frequency amplified within the lasing cavity. US Patent Application Publication No. 2009/0185585 of Farmiga et al. (incorporated above) includes a description of this phenomenon. The spacing variation, although sometimes small enough to be ignored, generally arises because the index of refraction of the lasing medium is sensitive to spectral frequency. For purposes of mode matching between the lasing and feedback cavities 162 and 164 the spacing between a given multiple of the feedback cavity modes can be either matched to the spacing of spacing the lasing cavity modes anywhere within or even beyond the intended range of tuning. For example, the spacing between a given multiple of the feedback cavity modes and a pair of lasing cavity modes could be matched near the center of the tuning range so that during any one sweep, the feedback cavity modes brought into alignment with the lasing cavity modes are themselves substantially evenly spaced at an integer multiple of the feedback cavity modes. Alternatively, the spacing between a given multiple of the feedback cavity modes and a pair of lasing cavity modes could be matched to other mode pairings elsewhere within the mode spectrum so that more feedback cavity modes are brought into alignment with the lasing cavity modes during each tuning sweep, although the spacing between the feedback modes brought into alignment is more irregular.

Although described with respect to a limited number of examples, those of skill in the art will appreciate a much wider range of applicability in keeping with the overall teaching of the invention. For example, other light sources and forms of wavelength tuning can be used to provide other stable tuning options, including incorporating gradual variations in tuning speed for influencing the frequency spacing between the acquired samples. Given the large number of interference images that can be quickly acquired by frame grabbing at small intervals of beam frequency variation, interference images corresponding to more than one pattern of beam frequency spacing can be assembled for processing. For example, a set of interference images captured at finely spaced intervals over a limited frequency range can be processed to extend the range of measurement, and another set of interference images captured at more coarsely spaced intervals over a wider frequency range can be processed to increase the measurement precision.

The invention claimed is:

1. A method of measuring a test object with a frequency-shifting interferometer comprising steps of varying a frequency of a measuring beam with a tunable light source of the frequency-shifting interferometer over a range of beam frequencies, forming with the frequency-shifting interferometer progressively changing interference images of the test object with the measuring beam over the range of beam frequencies, recording a set of interference image data corresponding to a succession of the changing interference images of the test object as the measuring beam is varied in frequency over the range of beam frequencies, monitoring the beam frequencies at which the interference image data corresponding to the succession of interference images are recorded, identifying a subset within the set of recorded interference data corresponding to interference images formed by beam frequencies that exhibit a predetermined pattern of beam frequency spacing and excluding from the subset other of recorded interference data corresponding to other of the succession of changing interference images formed by beam frequencies that that do not exhibit the predetermined pattern of beam frequency spacing, and processing the subset of recorded interference data without processing the recorded interference data excluded from the subset for deriving measurements for producing an optical profile of the test object.

2. The method of claim 1 in which the step of recording includes acquiring with a camera of the frequency-shifting interferometer interference image data from the succession of changing interference images of the test object as the measuring beam is varied in frequency over the range of beam frequencies, and in which the step of identifying the subset of recorded interference data includes identifying interference images of the test object formed by the beam frequencies that exhibit the predetermined pattern of beam frequency spacing.

3. The method of claim 2 in which the step of identifying the subset of recorded interference data includes distinguishing the subgroup of interference images of the test object formed by the beam frequencies that exhibit the predetermined pattern of beam frequency spacing from a remainder of the interference images of the test object formed by beam frequencies do not fit the predetermined pattern of beam frequency spacing.

4. The method of claim 2 in which the predetermined pattern of beam frequency spacing is a pattern in which the beam frequencies are approximately equally spaced.

5. The method of claim 4 in which the step of identifying the subset of recorded interference data includes allowing variation in a step size of an equal spacing pattern of beam frequencies for identifying interference images of the test object formed by the beam frequencies that exhibit a more equally spaced pattern of beam frequencies.

6. The method of claim 1 in which the step of forming with the frequency-shifting interferometer progressively changing interference images of the test object includes
 (a) dividing the measuring beam into an object beam for encountering the test object and a reference beam,
 (b) recombining the object beam and the reference beam, and
 (c) imaging the test object with the recombined object beam and reference beam to form the interference images of the test object.

7. The method of claim 6 in which the step of processing the subset of recorded interference data includes
 (a) measuring a rate of change in interference phase with respect to a change in the beam frequency for each of the plurality of points within the interference images of the test object, and
 (b) deriving measurements of the plurality of points as optical path length differences between the test and reference beams.

8. The method of claim 1 including a step of monitoring the beam frequencies at which the interference images of the test object are formed, wherein
 (a) the step of monitoring includes forming interference patterns with a beam monitoring cavity and
 (b) the step of recording includes acquiring with a camera of the frequency-shifting interferometer both the interference images of the test object and the interference patterns of the beam monitoring cavity.

9. The method of claim 8 in which the camera includes a data acquisition area, and the interference patterns of the beam monitoring cavity are formed together with the interference images of the test object within the acquisition area of the camera.

10. A method of measuring a test object with a frequency-shifting interferometer comprising steps of
 forming with the frequency-shifting interferometer a progression of interference images of the test object with a measuring beam that varies in beam frequency,
 capturing a succession of the interference images of the test object,
 monitoring with a frequency analyzer the beam frequencies at which the succession of interference images of the test object are captured,
 identifying a limited number of the captured interference images of the test object at which the monitored beam frequencies approximately match a predetermined beam frequency spacing pattern from among a larger number of the captured interference images that include captured interference images of the test object at which the monitored beam frequencies do not approximately match the predetermined beam frequency pattern, and
 processing interference image data within the limited number of the captured interference images of the test object without processing the interference images captured at the monitored beam frequencies that do not match the predetermined beam frequency pattern for determining frequencies at which the individual image points of the test object vary in interference phase with changes in the beam frequency as a measure of an optical profile of the test object.

11. The method of claim 10 in which the step of capturing includes capturing the succession of interference images of the test object at a first density and the step of identifying includes identifying the limited number of captured interference images of the test object at a second lower density.

12. The method of claim 10 in which interference image data from other of the captured interference image patterns that are not among the limited number of captured interference images of the test object at which the monitored beam frequencies approximately match the predetermined beam frequency spacing pattern is excluded from the processing of the interference data for determining the frequencies at which the individual image points of the test object vary in interference phase with changes in the beam frequency.

13. The method of claim 10 in which the step of capturing includes recording the beam frequencies at which the succession of interference images of the test object are captured.

14. The method of claim 13 in which the step of monitoring the beam frequencies at which the interference images of the test object are formed includes forming interference patterns with a beam monitoring cavity and the step of capturing includes acquiring with a camera of the frequency-shifting interferometer both the interference images of the test object and the interference patterns of the beam monitoring cavity.

15. The method of claim 13 in which the step of forming with the frequency-shifting interferometer the progression of interference images of the test object includes modulating output of a spectrally coherent light source over a range of beam frequencies for progressively varying the beam frequency of the measuring beam, and the step of monitoring with the frequency analyzer includes monitoring the progressively varying beam frequencies of the progression of interference images of the test object and providing feedback for influencing the output of the spectrally coherent light source.

16. The method of claim 15 in which the step of forming with the frequency-shifting interferometer the progression of interference images of the test object includes
 (a) dividing the measuring beam into an object beam for encountering the test object and a reference beam,
 (b) recombining the object beam and the reference beam, and
 (c) imaging the test object with the recombined object beam and reference beam to form the interference images of the test object.

17. The method of claim 10 in which the step of identifying a limited number of the captured interference images of the test object includes (a) matching certain of the monitored beam frequencies to a beam frequency spacing pattern of equal spacing between the beam frequencies, and
(b) allowing variation in a step size of the spacing between beam frequencies to identify interference images having beam frequencies that better match the pattern of equal spacing between the beam frequencies.

18. A frequency-shifting interferometer for measuring an optical profile of a test object comprising a tunable light source for outputting a measuring beam that progressively varies over a range of beam frequencies, beam routing optics that (a) divide the measuring beam into an object beam for encountering the test object and a reference beam and (b) recombine the object beam and the reference beam, imaging optics that image the test object with the recombined object beam and reference beam to form interference images of the test object, a frame grabber in association with a camera that captures a succession of the interference images of the test object, a frequency analyzer that monitors the beam frequencies at which the succession of interference images of the test object are captured, and a processor that (a) identifies a limited number of the captured interference images of the test object at which the monitored beam frequencies approximately match a predetermined beam frequency spacing pattern from among a larger number of the captured interference images that include captured interference images of the test object at which the monitored beam frequencies do not approximately match the predetermined beam frequency pattern and (b) processes interference image data within the limited number of captured interference images of the test object without processing the interference images captured at the monitored beam frequencies that do not match the predetermined beam frequency pattern for determining frequencies at which the individual image points of the test object vary in interference phase with changes in the beam frequency as a measure of the optical profile of the test object.

19. The interferometer of claim 18 in which the frequency analyzer includes a beam monitoring cavity that forms interference patterns and the camera acquires both the interference images of the test object and the interference patterns of the beam monitoring cavity.

\* \* \* \* \*